S. E. WOODBURY.
ELECTRIC CIRCUIT CONTROLLING DEVICE.
APPLICATION FILED MAY 8, 1917.
1,331,038.
Patented Feb. 17, 1920.
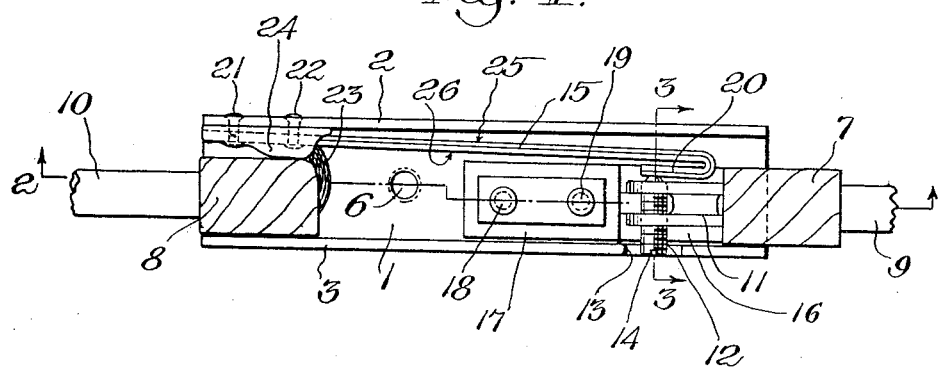
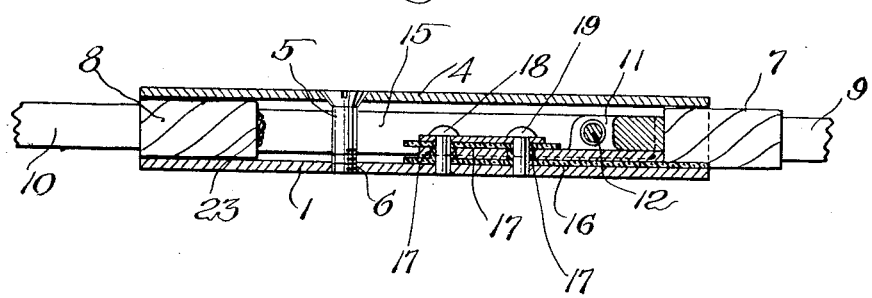
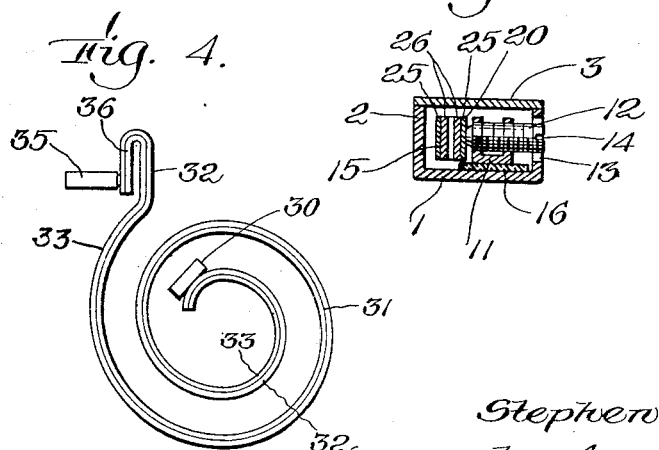
Inventor:
Stephen E. Woodbury,
by James R. Hodder.
Attorney.

UNITED STATES PATENT OFFICE.

STEPHEN E. WOODBURY, OF BEVERLY, MASSACHUSETTS, ASSIGNOR TO SIMPLEX ELECTRIC HEATING COMPANY, OF CAMBRIDGE, MASSACHUSETTS, A CORPORATION OF MASSACHUSETTS.

ELECTRIC-CIRCUIT-CONTROLLING DEVICE.

1,331,038.  Specification of Letters Patent.  Patented Feb. 17, 1920.

Application filed May 8, 1917. Serial No. 167,161.

*To all whom it may concern:*

Be it known that I, STEPHEN E. WOODBURY, a citizen of the United States, and resident of Beverly, county of Essex, and State of Massachusetts, have invented an Improvement in Electric - Circuit - Controlling Devices, of which the following description, in connection with the accompanying drawings, is a specification, like letters on the drawings representing like parts.

My present invention is an electric circuit controlling device and the object of the invention is to improve and perfect such devices.

As herein shown in a preferred form, my invention is embodied in a small and compact thermostat such as is used to control the electric current and consequently the heat supplied in pads, warming devices, and the like, where small size and long life are important, although the invention is not limited to thermostats nor to the amount of current controlled, but has other and broader fields of usefulness.

In the manufacture of electrically heated pads, it is customary to install the thermostat within the pad and hence compactness, as well as efficiency, are particularly desirable, and my invention is especially applicable to devices for that purpose. Heretofore it has been customary to utilize a simple thermostat comprising a straight double bar or lamina rigidly secured at one end and with the other end free and in position to engage an adjustable screw contact. In this prior construction the lamina was so arranged that as the temperature therein increased, the lamina would tend to move away from the contact screw, until the contact became very light and eventually would break. Upon the breaking of the contact, the thermostat would cool down sufficiently until the lamina would again contact and supply current and further heat. This prior construction was unsatisfactory, as it was found that, under many working conditions, the lamina would make and break repeatedly in intervals of a few seconds. It was also found that the cause of this unsatisfactory operation was the extra heat generated in the contacts when they were lightly contacting at the moment of either opening or closing circuit. This extra heat is very small in quantity, yet is amply sufficient to produce the result described, because it is applied to the lamina at the moment when it is most sensitive, that is the instant when contact is just being made or broken. This, of course, makes the thermostat operate many more times than is necessary to control the temperature of the heater in which it is installed, and practically "work the thermostat to death" when it would otherwise have had an indefinite life.

My present invention obviates the difficulty above noted and consists in constructing and arranging the thermostat, and particularly the relative position of the lamina and the adjustable contact, so that the heat in the contact will not unfavorably affect the action of the lamina in opening and closing the circuit. An important feature of my improvement consists in utilizing the heat generated in the contacts at the moment of breaking and making contact, to assist in positively opening or closing the electric circuit, according to which of these operations is being performed at the particular moment. Consequently in a thermostat embodying my improvement, when the lamina is heated to the adjusted degree for breaking, it will move to break the circuit with a positive complete action, and hold the circuit open until the temperature of the apparatus and the lamina itself has dropped sufficiently low to cause it to again make a positive contact with the adjusting screw at the temperature for which the latter has been set. All the repeated making and breaking every few seconds which occurred in the prior construction is eliminated by my improvement, and the contact made with the movable end of the lamina is a surer, better and firmer contact than in the prior devices. In a thermostat I accomplish this desirable result by so forming the lamina that its movement away from and toward the adjusting screw contact will be controlled by the heat in the lamina remote from said contact, preferably by bending the contact end of the lamina near the contact screw. Consequently the localized heat at the contact will affect only the short looped or bent portion of the lamina, and have no effect in the actual movement of the main part of the lamina itself.

Thus my improved thermostat will open once and remain open until the main portion of the lamina cools sufficiently to make contact, whereupon it makes a firm contact once and holds the same until again heated sufficiently to break the contact. By proper adjustment and construction it is feasible to so arrange my improvement in the thermostat that it will not cause the contact to hold too long before breaking, and therefore this improved thermostat controls the heat as closely as the prior type, and well within the usual range limits to which it is set, without material variation. By proportioning the looped or bent part I can effectually provide a compensated construction of thermostat, so that the lamina will control the current most satisfactorily. It will, therefore, be appreciated that this improved thermostat will act most efficiently, preventing any destructive effect due to a light contact and constant making and breaking, as in prior devices, and will retain its efficiency during a much longer use or "life" than was formerly possible.

Referring to the drawings illustrating a preferred embodiment of the invention,

Figure 1 is a plan view partly in cross section of my improvement applied to a thermostat.

Fig. 2 is a side view, also partly in cross section on the longitudinal line 2 of Fig. 1; and Fig. 3 is a cross sectional view on the line 3—3 of Fig. 1;

Fig. 4 is a diagrammatic view of a modified form.

As shown in the drawings, a suitable inclosing and supporting case is provided, consisting in a U-shaped member 1 with the sides 2 and 3 formed integrally therewith and constituting a trough-shaped box to which is secured the top or cover 4 by a screw 5, which screw is threaded into a correspondingly tapped recess 6 in the portion 1, as clearly shown in Fig. 2. This inclosing case or receptacle may be of brass or other suitable material. At each end the current wires are led into the receptacle through suitable tape or insulating material as indicated at 7 and 8, said wires being shown at 9 and 10 respectively. At the end 7 the current wires are led to and electrically united with a forked member 11, having threaded apertures in alinement near the free end through which is threaded an adjustable contact screw 12 of conductive material. A suitable recess 13 in the side 3 permits access to the slot 14 in the head of said screw so that it may be threaded through the member 11 to adjust the contact and consequently the temperature at which the thermostat is set. The member 11 is preferably insulated from the supporting case by mica layers 16, 16, and the rivets 18 and 19, are insulated by fiber washers 17, 17, as clearly shown in Fig. 2. The lamina 15 is formed with a doubled or looped end portion 20 bent backwardly and in position to contact with an end of the adjusting screw 14. This lamina has its other end rigidly secured by screws 21 and 22 to the side 2, and electrically integral therewith, or may be insulated similarly to the member 11, and connected with the wires, as indicated at 23, which are electrically secured by solder or the like at 24 to the adjacent end of the lamina 15.

The operation of my improved thermostat is as follows:

The lamina 15, comprising the main or straight portion with short looped bent end 20 is normally in position to make contact with the adjustable contact screw 12, as shown. The current being applied, the heat from the appliance in which the thermostat is installed causes the lamina to lift from the contact screw, by reason of the differential action of the two metals, 25 and 26, comprising the thermostat,—the layer 26 having the greater expansibility under heat,—thus breaking the contact when a predetermined temperature is reached.

At the moment of breaking the electric heating circuit, because of increase of temperature in the lamina, the light contact by increasing its electrical resistance will cause the electric current to slightly increase the temperature of the loop end and thereby cause it to move away from the main portion of the lamina and continue to remain in such remote position until the actual moment of breaking circuit. When in consequence of the breaking of the circuit, the electric current ceases, the heat in the short loop portion of the lamina is quickly radiated and diffused, allowing said loop portion to close slightly toward the main portion, thus positively preventing any recurring contact until the temperature is reduced.

Also, by this arrangement, at the moment of completing the electric heating circuit by the closing of the contacts because of a decrease of temperature in the lamina, the very light nature of the initial contact will, by producing electrical resistance, cause the electric current to slightly increase the temperature of the looped end of the lamina without appreciably affecting the main portion, thus causing the loop to move away from the main portion of the lamina and thereby positively close the circuit with a firm secure contact.

Thus the useless and repeated opening and closing at short intervals that characterize the prior construction are obviated in my present improvement. I prefer to form the lamina with the bent portion 20 as shown, although I may utilize any other current carrying means which will hold the main portion 15 of the lamina spaced from the contact screw 12 and member 11, thus freeing the operative portion of the lamina from the influence of the heat in said contact. I find that the spacing of 1/100 of an inch is sufficient for a thermostat employed in electrically heated pads.

While I have illustrated in Figs. 1, 2 and 3 the commercial form of a thermostat, embodying my invention in simple contour, it will be understood that I am not limited to this form, and as further illustrating the invention I have shown in Fig. 4 the outline of a different form of thermostat. In this modified form shown in diagrammatic position, a suitable support is indicated at 30, such for example as a supporting post from an inclosing casing. To this support the lamina 31 has one end secured, which lamina has the layer 32 consisting of the metal of greater expansible capacity and the layer 33 of the lesser capacity. A contact is indicated at 35 and near said contact the looped end 36 of the lamina is formed. The operation of this type of lamina is identical with that of the form shown in Figs. 1, 2 and 3. When the temperature rises, the layer 32 expanding and the layer 33 contracting relatively, will tend to move the looped end 36 away from the contact 35, while the reverse action is going on in the short length of the looped end, tending to move said looped portion toward the contact. Consequently a firm contact is maintained until the greater action of the main portion of the lamina positively forces away the looped end 36, cutting off the current and allowing the heat to be reduced. During said reduction of heat and consequent cooling of the lamina, the shorter looped portion 36 is tending to contract and move away from the contact 35 while the main portion of the lamina is moving toward said contact. Therefore the contact is delayed until finally established in a firm and positive manner.

I have also discovered that substantially the same result can be produced, as that above explained and illustrated by forming the lamina straight throughout its entire length and in place of the short looped end to simply twist a similar short portion one-half around, or through 180°, thus presenting to the contact screw the same side at the end of the lamina as in the looped end portion construction. In addition to this modification, other embodiments of the invention will readily occur to those skilled in this art. Thus, for example, the main portion of the lamina may have a short separate end portion in place of the looped or twisted section as above explained, which end portion can be secured at an angle or otherwise, between the main portion of the lamina and the contact, preferably spacing said main portion and holding it and the contact portion spaced from and with freedom of movement in each, either during the making or breaking of contact.

The advantages of my thermostat will be clearly appreciated. By making the free contact end of the lamina bend more or less as desired, I am enabled to provide a firm contact closing force, as well as to compensate for the possibility of causing the contact to hold too long before breaking, and to insure the action of the thermostat to depend upon the heating and cooling of the main portion of the lamina itself free from control of the excess heat in the contacts.

While I have shown my improved thermostat as consisting in a double lamina with a main portion and a looped, twisted or bent portion, it will be appreciated that I may utilize other forms and means than the bent portion to give the contact and current carrying provision to the straight portion of the lamina and to hold the latter free from the heating action of the contact. I intend to claim my invention broadly, irrespective of the particular construction of a looped portion, as shown, or twisted end portion as above explained. It is also feasible to secure a considerable adjustment by bending the looped end more or less, although I prefer to employ the usual adjustable screw contact as shown.

As explained herein, I have emphasized the advantageous features of a thermostat wherein my arrangement insures a single positive make and break at the contact end, the opposite expansible tendencies of the main portion of the lamina and the short looped portion producing this result.

It is, however, within the contemplation of my present invention to reverse the positions of the differentially expanding materials of the short portion of the lamina, relative to the position of these materials in the main portion, thereby producing an action opposite to that of the construction shown in the drawings. This reverse construction will accentuate the repeated making and breaking contact and consequent wear of the contacts, but involves a principle in temperature control that it will be desirable to utilize in certain special cases.

It is within the scope of my present invention to claim as original, the application of any body or material whose shape is subject to change with changes of temperature to insure a positive opening or closing of an electric circuit, when such changes of temperature are produced by the heat generated by an electric current flowing in the contact. The thermostat described represents a device in which the invention is applicable, but the invention may be equally applicable to any electrical-contact-making device, irrespective of the means employed to move the contacts together or apart.

My invention is further described and defined in the form of claims as follows:

1. In an electric controlling device, a member composed of two walls in contact throughout their length and movably affected by temperature changes, said member comprising a main part and a contact portion, constructed and arranged for relative movements of said main part and contact portion in opposite directions during the same temperature change, said contact portion being spaced from the main portion at its point of contact, whereby automatic means to positively and completely open or close the electric circuit at the main part and the contact portion of the device, is effected.

2. A thermostat having a lamina of two members in contact throughout their length one end being rigidly supported, the main portion of said lamina being arranged for movement to or from a contact, a looped end portion of the lamina spaced from said main portion and in position to engage a contact, the relative movements of the main portion and said looped portion being in opposite directions during temperature changes.

3. In a thermostat of the kind described, a supporting case, a lamina composed of two members in contact throughout their length having one end rigidly connected to said case, an adjustable contact carried by said case, the lamina consisting in one portion adapted to be moved toward and from the contact by temperature changes, and means spaced from said movable portion but carried therewith to hold the movable portion out of influence of excess heat at the contact while carrying current therefrom, and current supply wires to and from said thermostat.

In testimony whereof, I have signed my name to this specification, in the presence of a subscribing witness.

STEPHEN E. WOODBURY.

Witness:
 DUNCAN L. MACINTYRE.